(12) United States Patent
Ikuta et al.

(10) Patent No.: US 6,424,613 B1
(45) Date of Patent: Jul. 23, 2002

(54) IRON CORE COIL MOTOR AND DISK DRIVE

(75) Inventors: Hiroshi Ikuta, Chiba; Mitsuhiro Ueno; Kentaro Soeda, both of Tokyo; Yuji Shishido, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/549,528

(22) Filed: Apr. 14, 2000

(30) Foreign Application Priority Data

Apr. 2, 1999 (JP) ............................................. 11-111759

(51) Int. Cl.[7] ............................................. G11B 25/00
(52) U.S. Cl. .......................................... 369/266; 310/90
(58) Field of Search ........................... 360/99.08, 99.04, 360/99.07; 369/266; 310/67 R, 90

(56) References Cited

U.S. PATENT DOCUMENTS 5,089,732 A * 2/1992 Konno et al. ............. 310/67 R
5,357,162 A * 10/1994 Aiyoshizawa et al. ........ 310/90
5,357,163 A * 10/1994 Minakuchi et al. ........... 310/90
5,783,886 A * 7/1998 Hong ......................... 310/90.5

* cited by examiner

Primary Examiner—David Hudspeth
Assistant Examiner—Angel Castro
(74) Attorney, Agent, or Firm—Rader. Fishman & Grauer PLLC; Ronald P. Kananen (57) ABSTRACT

There is provided an iron core coil motor using an iron core coil, as a stator coil, formed by winding a coil winding around an iron core. Floating in the shaft direction of rotor is prevented with an attracting force generated by offsetting the center of magnetism of iron core of coil and the center of magnetism of rotor magnet and moreover the attracting force is set to 0.8 to 2.0 times the total weight of the rotating elements including rotor. Thereby, generation of noise and vibration can be controlled.

2 Claims, 7 Drawing Sheets

THIN SPINDLE MOTOR — HORIZONTAL ATTITUDE

| Mg ATTRACTING FORCE/WEIGHT OF ROTATING ELEMENTS | SWITCHING NOISE | | | HOPPING NOISE | | |
|---|---|---|---|---|---|---|
| | 3800 rpm | 4200 rpm | 6200 rpm | 3800 rpm | 4200 rpm | 6200 rpm |
| 0.41 | | | | -0.14 | -0.43 | -0.50 |
| 0.51 | -22.68 | -21.12 | -20.70 | -7.39 | -11.34 | -9.37 |
| 0.64 | -21.66 | -21.55 | -20.35 | -10.39 | -15.88 | -12.22 |
| 0.8 | -19.00 | -17.62 | -21.29 | | | |
| 1 | -22.15 | -20.27 | -16.68 | | | |
| 1.25 | -22.06 | -22.83 | -21.12 | | NOT GENERATED | |
| 1.56 | -22.49 | -17.62 | -18.48 | | | |
| 1.95 | -19.68 | -23.05 | -20.52 | | | |
| 2.495 | -11.65 | -17.37 | -7.12 | | | |
| 3 | -16.00 | -12.51 | -10.00 | | | |

WEIGHT OF ROTATING ELEMENTS: 26.33g (DISK + ROTOR)

FIG. 4

THIN SPINDLE MOTOR — VERTICAL ATTITUDE

| Mg ATTRACTING FORCE/WEIGHT OF ROTATING ELEMENTS | SWITCHING NOISE ||| HOPPING NOISE |||
|---|---|---|---|---|---|---|
| | 3800 rpm | 4200 rpm | 6200 rpm | 3800 rpm | 4200 rpm | 6200 rpm |
| 0.41 | | | | -0.14 | -0.43 | -0.50 |
| 0.51 | -22.31 | -20.81 | -20.72 | -5.83 | -8.46 | -7.00 |
| 0.64 | -22.58 | -21.65 | -19.36 | -7.00 | -13.90 | -9.03 |
| 0.8 | -18.61 | -24.10 | -20.47 | | | |
| 1 | -20.72 | -19.37 | -17.52 | | | |
| 1.25 | -23.08 | -23.80 | -20.64 | | NOT GENERATED | |
| 1.56 | -21.23 | -22.86 | -17.77 | | | |
| 1.95 | -18.89 | -22.31 | -20.05 | | | |
| 2.44 | -11.28 | -15.33 | -6.64 | | | |
| 3 | -9.83 | -11.75 | -13.55 | | | |

WEIGHT OF ROTATING ELEMENTS: 26.33g (DISK+ROTOR)

FIG. 5

STANDARD SPINDLE MOTOR — HORIZONTAL ATTITUDE

| Mg ATTRACTING FORCE/WEIGHT OF ROTATING ELEMENTS | SWITCHING NOISE | | | HOPPING NOISE | | |
|---|---|---|---|---|---|---|
| | 3800 rpm | 4200 rpm | 6200 rpm | 3800 rpm | 4200 rpm | 6200 rpm |
| 0.41 | | | | 0.00 | 0.00 | 0.00 |
| 0.51 | -16.33 | -14.46 | -14.20 | -5.20 | -3.46 | -2.00 |
| 0.64 | -15.59 | -14.21 | -15.00 | -5.80 | -8.41 | -4.03 |
| 0.8 | -15.24 | -18.05 | -13.44 | NOT GENERATED | | |
| 1 | -17.88 | -12.41 | -15.91 | | | |
| 1.25 | -13.80 | -12.59 | -11.39 | | | |
| 1.56 | -17.45 | -16.09 | -13.10 | | | |
| 1.95 | -12.31 | -8.89 | -9.80 | | | |
| 2.495 | -8.57 | -4.90 | -3.20 | | | |
| 3 | -6.27 | -0.21 | 0.00 | | | |

WEIGHT OF ROTATING ELEMENTS: 40g (DISK+ROTOR)

FIG. 6

STANDARD SPINDLE MOTOR — VERTICAL ATTITUDE

| Mg ATTRACTING FORCE/WEIGHT OF ROTATING ELEMENTS | SWITCHING NOISE | | | HOPPING NOISE | | |
|---|---|---|---|---|---|---|
| | 3800 rpm | 4200 rpm | 6200 rpm | 3800 rpm | 4200 rpm | 6200 rpm |
| 0.41 | | | | 0.00 | 0.00 | 0.00 |
| 0.51 | -15.16 | -15.24 | -13.52 | -0.38 | -3.00 | 0.05 |
| 0.64 | -15.24 | -13.89 | -13.13 | -0.46 | -5.67 | -4.39 |
| 0.8 | -14.65 | -15.92 | -13.72 | | | |
| 1 | -13.64 | -14.23 | -17.43 | | | |
| 1.25 | -12.54 | -15.00 | -10.94 | | NOT GENERATED | |
| 1.56 | -16.93 | -13.64 | -15.33 | | | |
| 1.95 | -11.78 | -9.34 | -13.00 | | | |
| 2.44 | -9.34 | -5.80 | -3.77 | | | |
| 3 | -7.00 | -1.66 | -0.40 | | | |

WEIGHT OF ROTATING ELEMENTS: 40g (DISK+ROTOR)

FIG. 7

IRON CORE COIL MOTOR AND DISK DRIVE

BACKGROUND OF THE INVENTION

1. Field of the Invention

The present invention relates to a novel iron core coil motor and a disk drive and more specifically to a technique to control generation of noise and vibration.

2. Description of the Related Art

In a certain iron core coil motor, removing of rotor in the axial direction is prevented by utilizing an attracting force which is generated by deviating the centers of magnetism of the iron core of coil and rotor magnet.

In the iron core coil motor of the related art explained above, if attracting force is too weak, a rotor seems to be floated, resulting in a problem that vibration (hopping noise) is easily generated. When such a motor is used as a spindle motor of the disk drive, read error of signal may be generated due to vibration and particularly when resonance is generated, there rises a problem that read operation becomes almost impossible.

On the contrary, if attracting force is too intensive, noise (switching noise) is generated due to a vibration accelerating force in the axial direction which is generated at the time of switching because of a difference of magnetic flux density in the axial direction of iron core, thereby resulting in a problem that operating conditions are not so good.

SUMMARY OF THE INVENTION

It is therefore an object of the invention to control generation of noise and vibration generated during operation.

An iron core coil motor of the present invention successfully realizes, in order to solve the problems explained above, that an attracting force generated when the centers of magnetism of iron core of coil and rotor magnet are deviated is set to 0.8 to 2.0 times the weight of all rotating members including the rotor.

Therefore, in the iron core coil motor of the present invention, hopping noise is not generated even if the coil motor is used in the vertical attitude and moreover switching noise is never generated.

In addition, the disk drive of the present invention realizes, in a spindle motor utilizing the iron core coil motor, that an attracting force generated when the centers of magnetism of iron core of coil and rotor magnet are deviated is set to 0.8 to 2.0 times the total weight of the rotating members including a turn table and a disk type storage medium or the like.

Therefore, in the disk drive of the present invention, hopping noise is not generated and signal read error is not easily generated even when the motor is used in the vertical attitude (the rotating axis becomes horizontal). Moreover, switching noise is not generated and thereby good operating condition can be maintained.

DESCRIPTION OF THE PREFERRED EMBODIMENT

A preferred embodiment of the iron core coil motor and disk drive of the present invention will be explained with reference to the accompanying drawings.

Summary of the disk drive will be explained with reference to FIG. 1.

In the embodiment illustrated, the present invention is adapted to an optical disk drive which records and/or reproduces data of an optical disk.

An optical disk drive 1 is structured by mounting a drive unit 3 formed by mounting required members and parts to a mechanical chassis 2 to a base chassis 5 through elastic members (dampers) 4, 4 . . .

At one end part of the mechanical chassis 2, a spindle motor 6 is fixed via a stator substrate 7. The spindle motor 6 is formed as an iron core coil motor.

Figure 2:
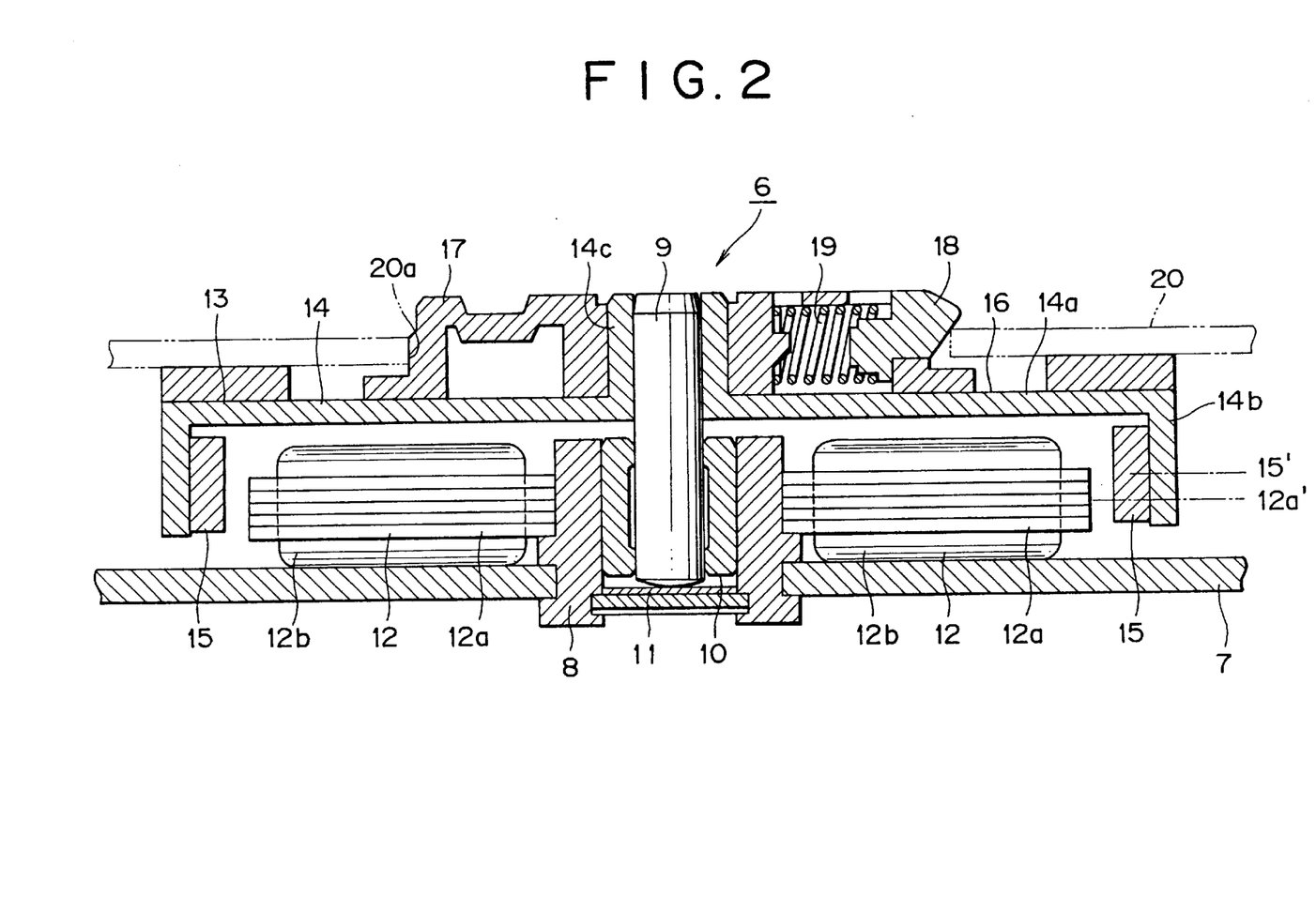
FIG. 2 is a vertical cross-sectional view of a spindle motor.

As will be obvious from FIG. 2, a cylindrical shaft supporting member 8 is fixed to the stator substrate 7 and a spindle shaft 9 is supported to rotate by the shaft supporting member 8 through a bearing metal 10. Moreover, the lower end of the spindle shaft 9 is supported by a thrust bearing 11 mounted to the shaft supporting member 8. Moreover, stator coils 12, 12, . . . are arranged and fixed to surround the shaft supporting member 8 on the stator substrate 7. The stator coil 12 is formed by winding a coil winding 12b around the iron core 12a.

At the upper half of the spindle shaft 9, a rotor 13 is fixed. The rotor 13 is composed of a rotor case 14 and a rotor magnet 15.

The rotor case 14 is formed of a non-magnetic material, in which a disk part 14a, circumference wall part 14b projected downward from the circumference edge of the disk part 14a and a boss 14c projected at the center area of the disk part 14a are integrated and the upper half of the spindle shaft 9 are inserted with pressure to the boss 14c.

The rotor magnet 15 is fixed at the internal surface of the circumference wall part 14b of the rotor case 14.

The center 12a' of magnetism of iron core 12a of the stator coil 12 is offset from the center 15' of magnetism of the rotor magnet 15. Namely, the center 12a' of the iron core 12a is deviated toward the lower position from the center 15' of the rotor magnet 15. Thereby, the rotor 13 is attracted downward in view of preventing the floating thereof.

Moreover, the upper surface of disk part 14a is used as a turn-table 16. At the center of upper surface of the disk part 14a, an engaging projection 17 is provided. This engaging projection 17 is provided in the circumference direction with isolated three engaging pawls 18, 18, 18 (only one is illustrated in the figure) and these engaging pawls 18, 18, 18 are all caused to be projected from the circumference surface of the engaging projection 17 by means of coil springs 19, 19, 19 (only one is illustrated in the figure). However, when an optical disk 20 is placed on the turn-table 16, the engaging projection 17 is engaged with the center hole 20a of the optical disk 20. Thereby, the engaging pawls 18, 18, 18 are once drawn within the engaging projection 17, allowing the optical disk 20 to move downward. Thereafter, the engaging pawls 18, 18, 18 are then caused to be projected from the engaging projection 17 with the force of the coil springs 19, 19, 19 to clamp the upper part of the aperture edge of the center hole 20a of the optical disk 20. As explained above, the optical disk 20 is loaded on the turn-table 16.

Figure 1:
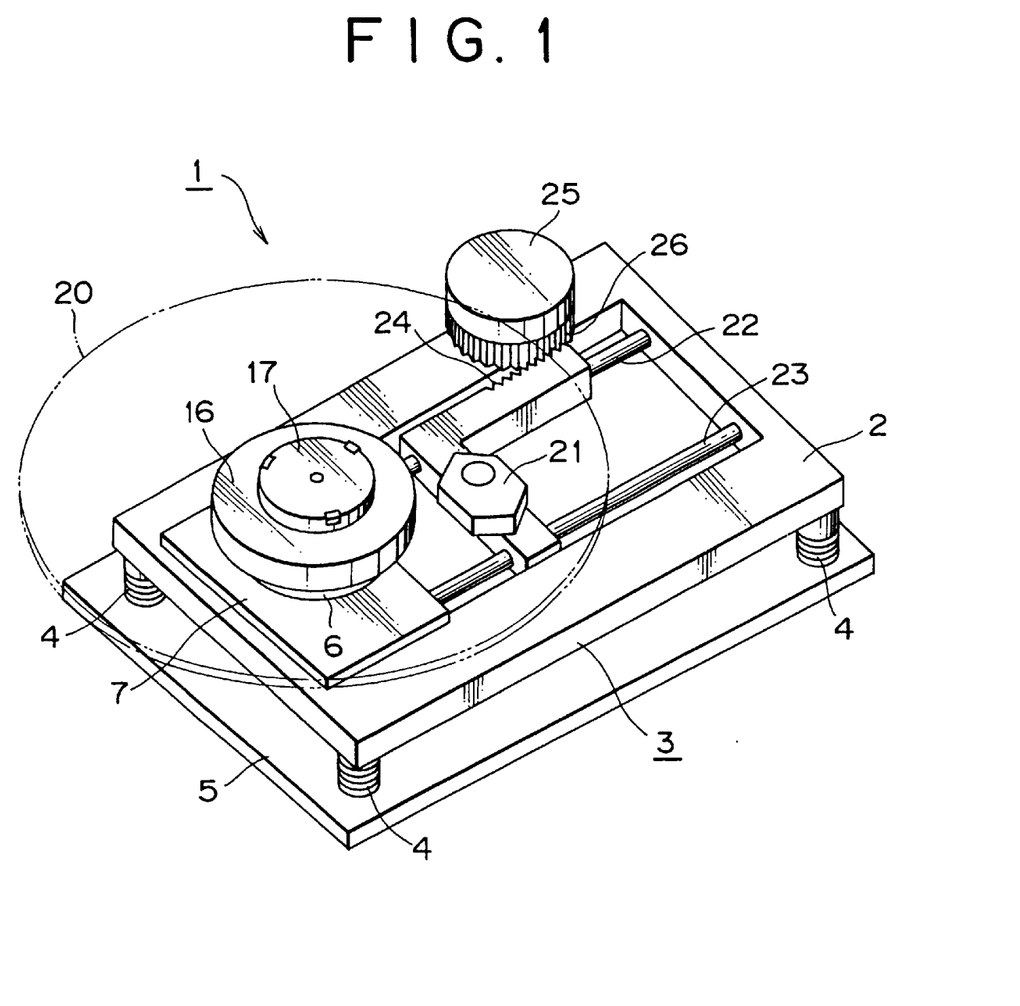
FIG. 1 is a schematic perspective view of a disk drive as a preferred embodiment of iron core coil motor and disk drive of the present invention.

The part, after the area on which the spindle motor 6 is arranged, of the mechanical chassis 2 is supported by the guide shafts 22, 23 so that an optical pickup 21 can move freely in the radius direction of the optical disk 20 supported on the turn-table 16 (refer to FIG. 1).

The optical pickup 21 is provided with a rack gear 24 and when the rack gear 24 is transferred by a pinion gear 26 which is rotated by a sled motor 25 fixed to the mechanical chassis 2, the optical pickup 21 is guided by the guide shafts 22, 23 to move in the radius direction of the optical disk 20 supported on the turn-table 16 (refer to FIG. 1).

The required members and parts are also loaded on the mechanical chassis 2 in addition to above elements to form a drive unit 3.

Thereby, the optical disk 20 supported on the turn-table 16 is rotated together with the turn-table 16 due to rotation of the spindle motor 6 and while the optical pickup 21 moves in the radius direction of the optical disk 20, signal may be recorded and/or reproduced to or from the optical disk 20.

An attracting force (hereinafter referred to as Mg attracting force) to be generated by offsetting the center 12a' of magnetism of the coil iron core 12a and the center 15' of magnetism of the rotor magnet 15 is set within the range of 0.8 times to 2.0 times the total weight of the rotor 13, respective members 17, 18, 19 forming the turn-table 16 and optical disk 20.

Accordingly, noise to be generated when floating of rotor 13 from the stator substrate 7, namely hopping noise and noise, namely switching noise generated depending on the switching of current applied to the stator coil 12 can be reduced or eliminated by setting the Mg attracting force as explained above.

FIG. 3 to FIG. 6 illustrate experimental data.

Figure 7:
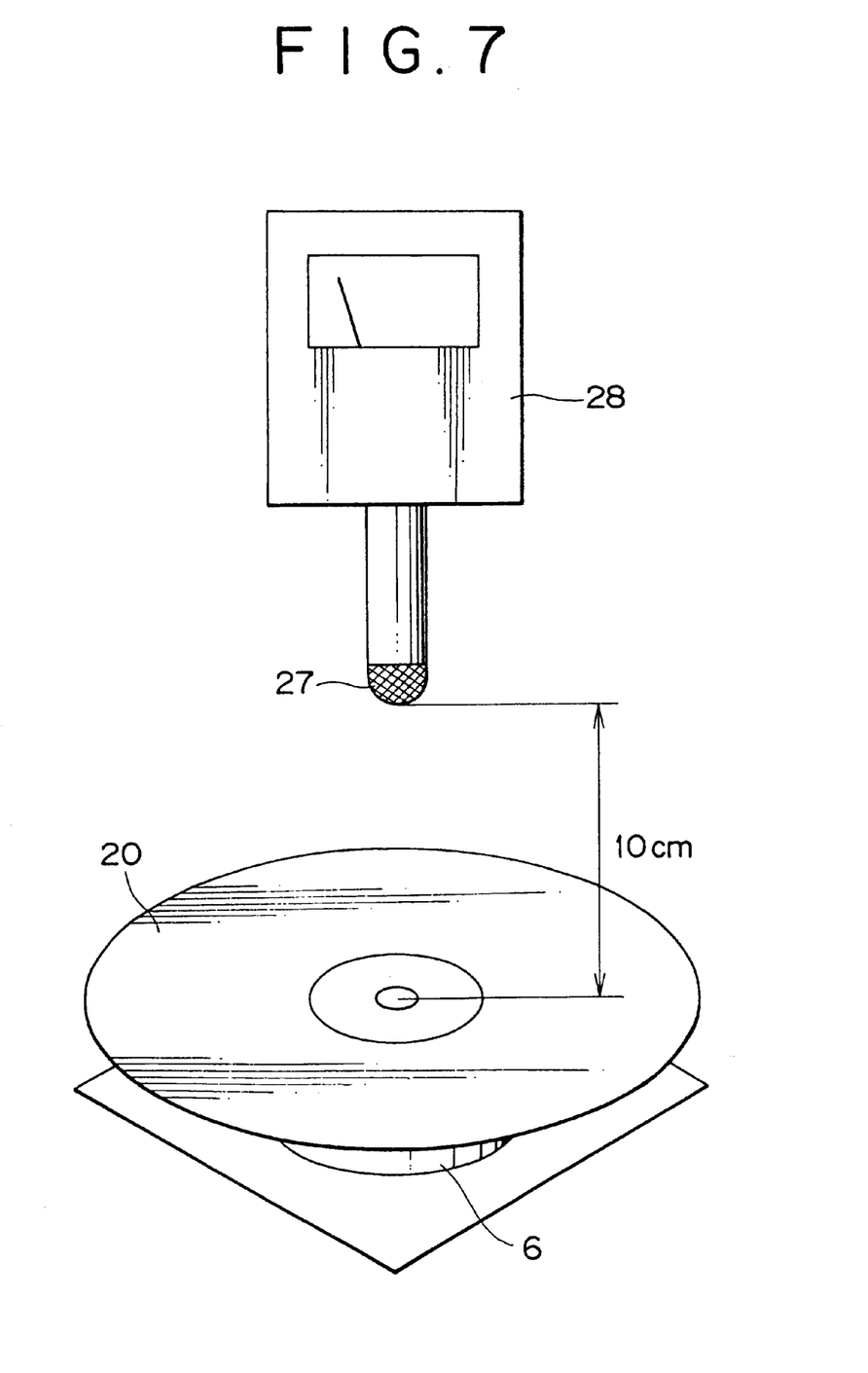
FIG. 7 is a schematic perspective view illustrating a method of collecting the data indicated in FIG. 3 to FIG. 6.

As illustrated in FIG. 7, these experimental data are obtained by measuring the noise level with a sound pressure meter through a microphone 27 located at the area in 10 cm from the center of the optical disk 20 placed on the turn-table 16.

Figure 3:
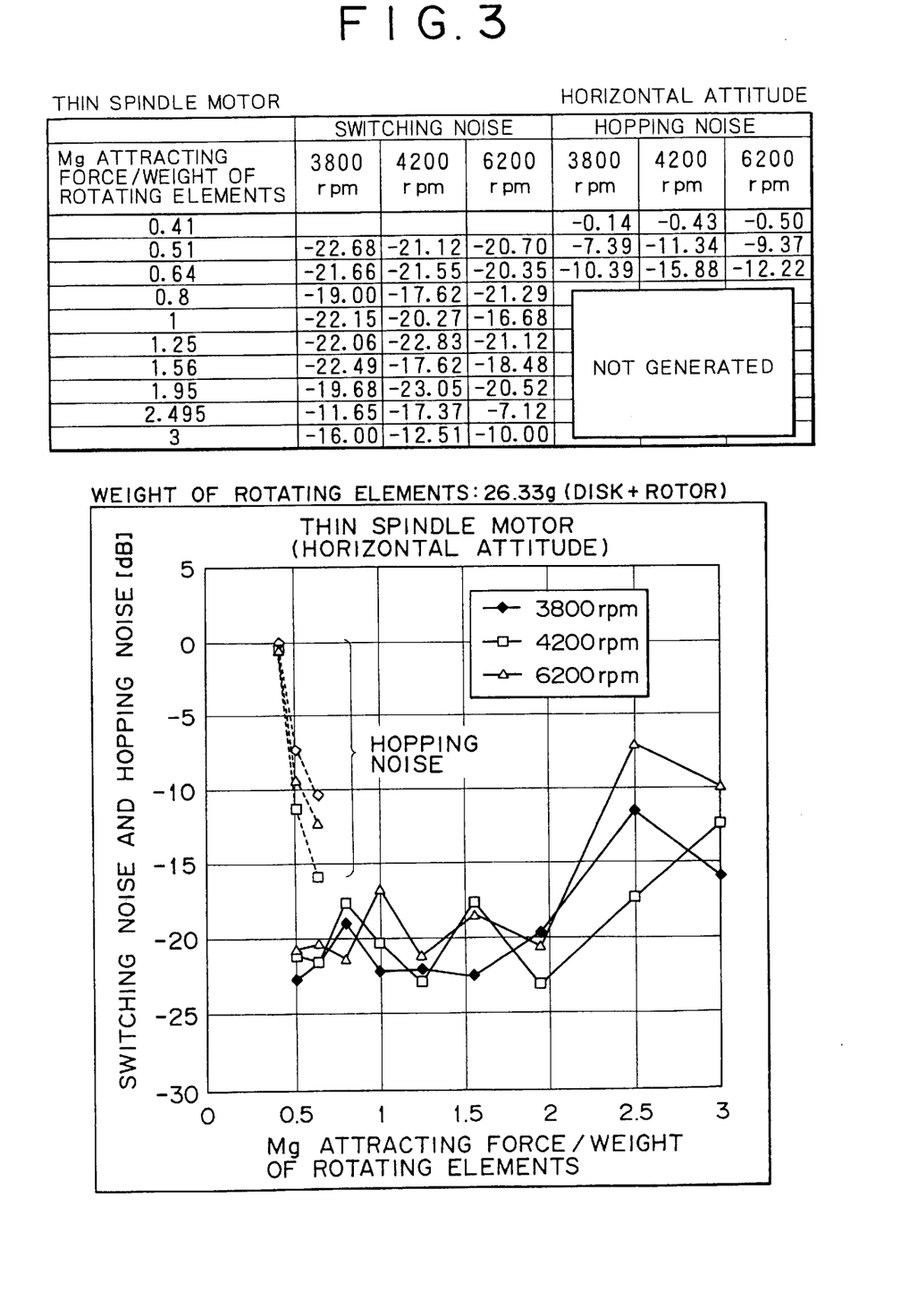
FIG. 3 illustrates a table and a graph indicating the data obtained by measuring switching noise and hopping noise when a thinner spindle motor is set horizontally.
Figure 4:
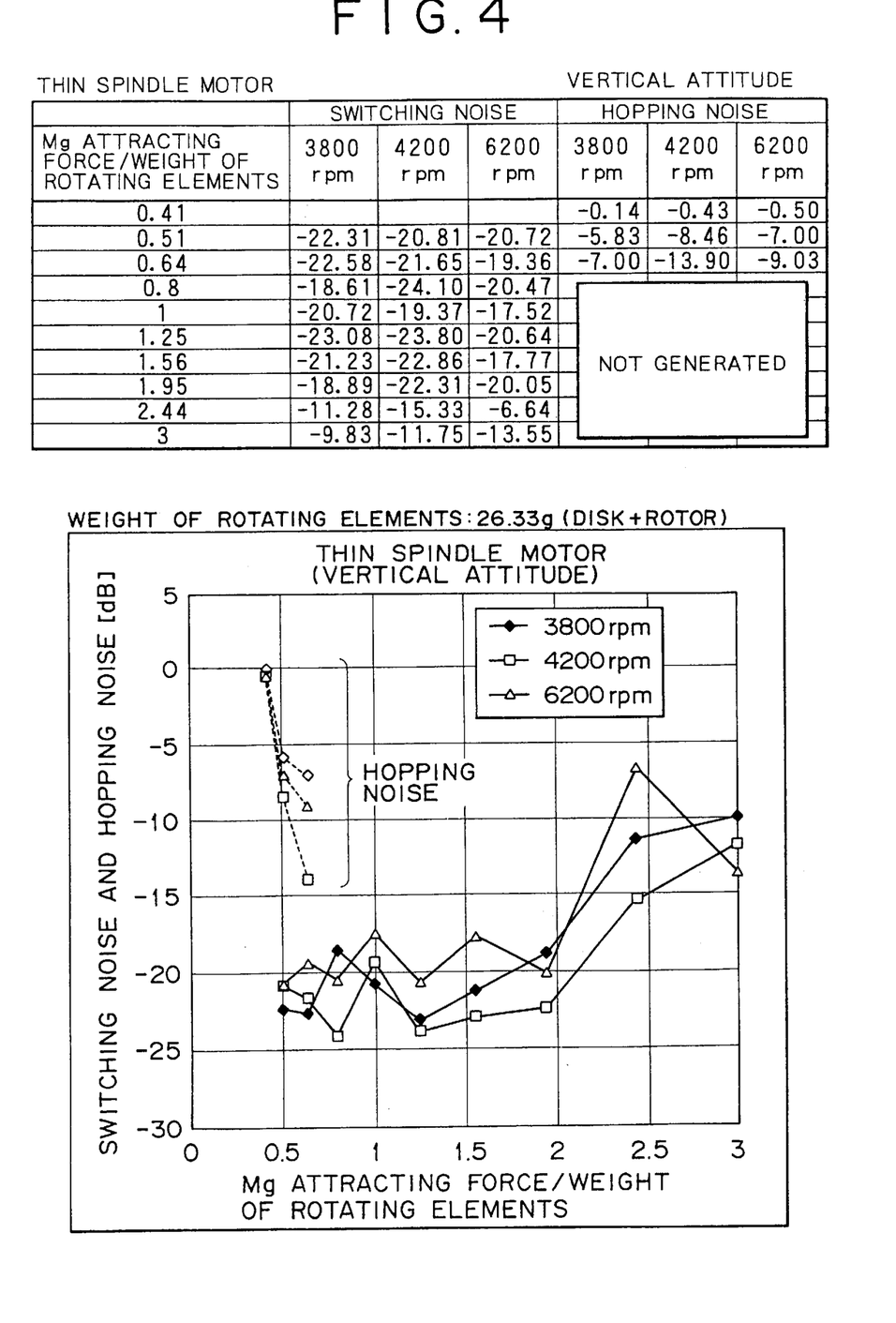
FIG. 4 illustrates a table and a graph indicating the data obtained by measuring switching noise and hopping noise when a thinner spindle motor is set vertically.
Figure 5:
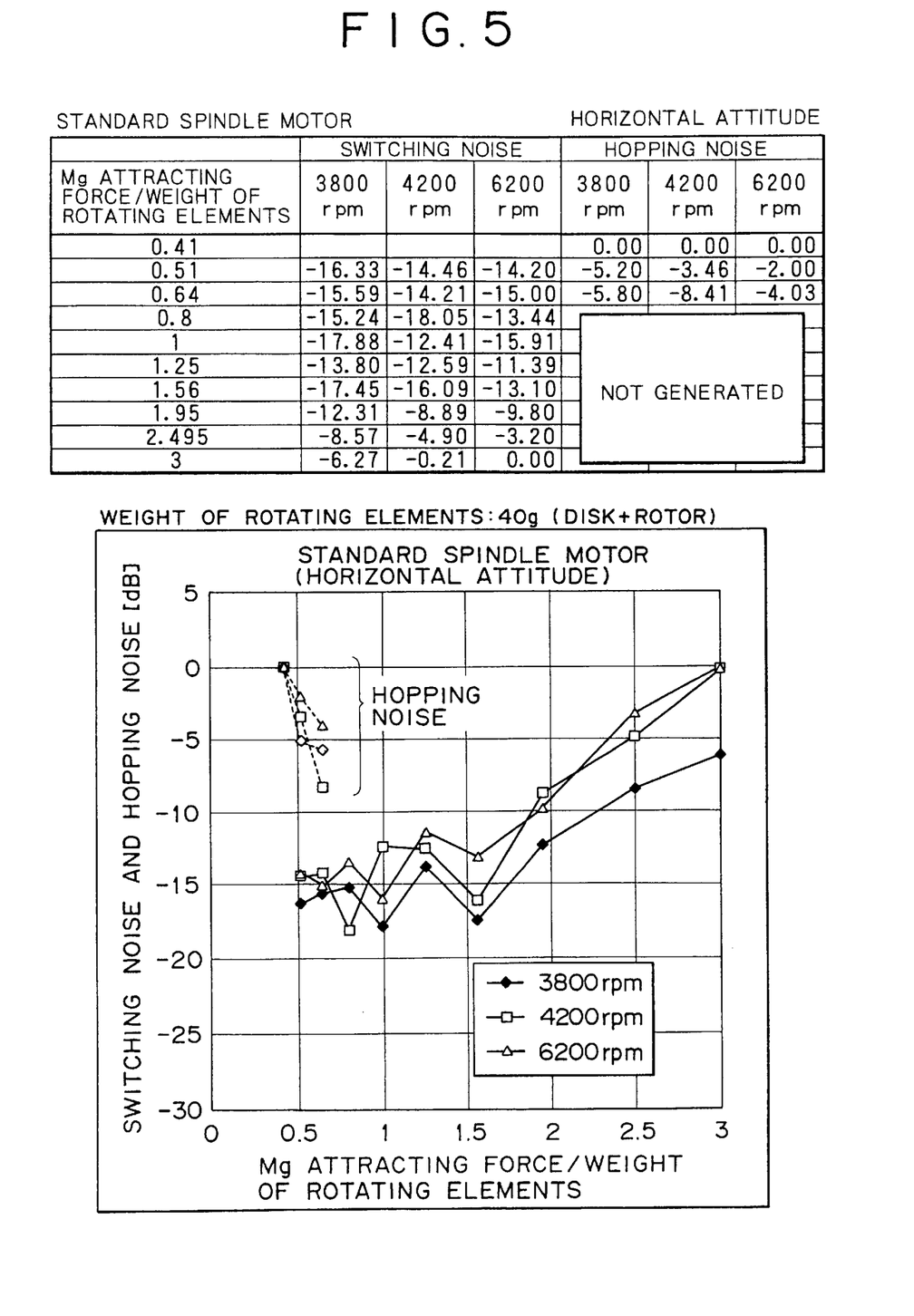
FIG. 5 illustrates a table and a graph indicating the data obtained by measuring switching noise and hopping noise when a standard spindle motor is set horizontally.

Moreover, FIG. 3 to FIG. 5 respectively illustrates the tables and graphs of the results in these tables, in which the switching noises and hopping noises are measured when the number of rotations is set to 3800 rpm, 4200 rpm and 6200 rpm under the condition that the value of Mg attracting force/Total weight of rotating elements is set to 0.41, 0.51, 0.64, 0.8, 1, 1.25, 1.56, 1.95, 2.495 (2.44 in the case of vertical attitude) and 3.

Figure 6:
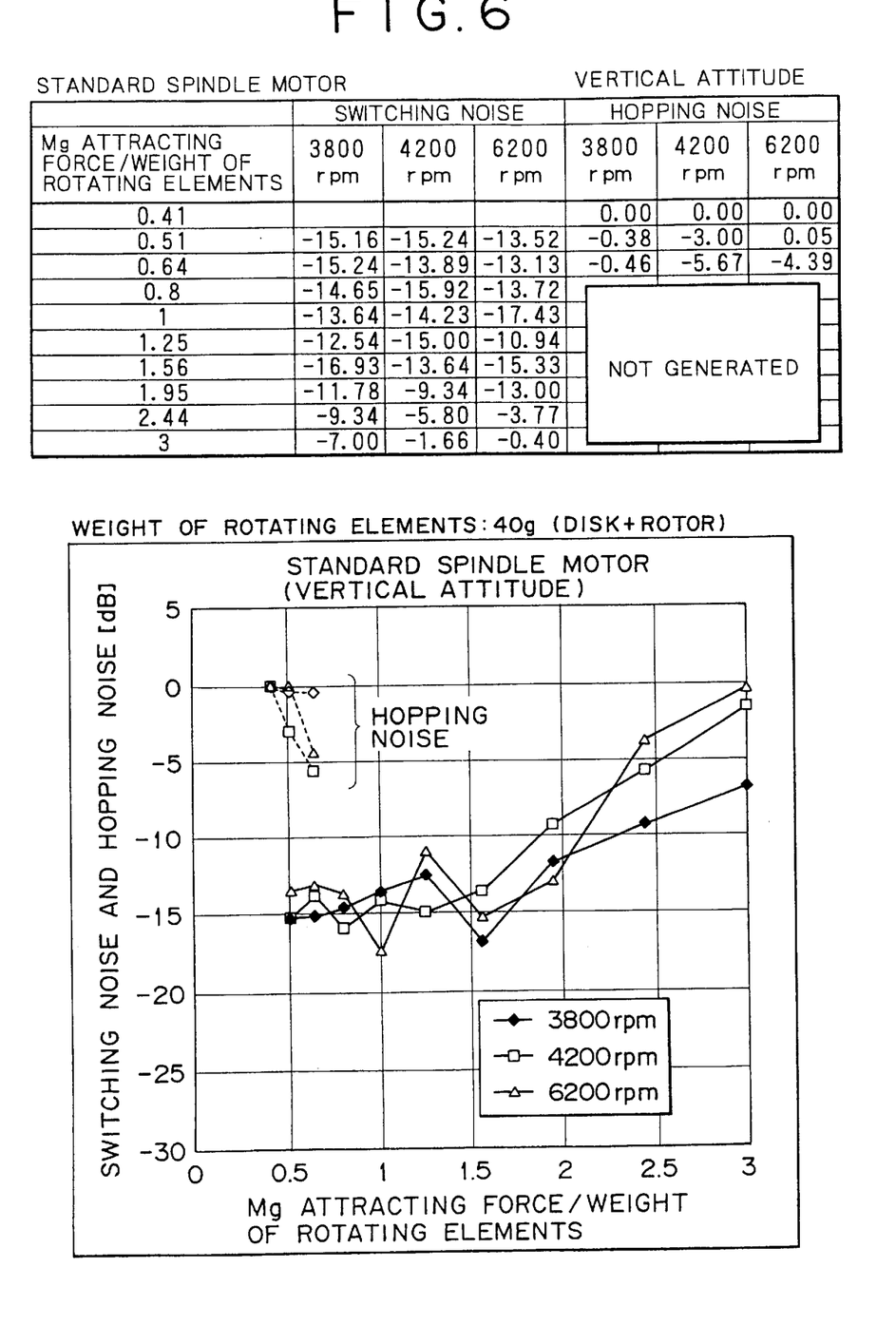
FIG. 6 illustrates a table and a graph indicating the data obtained by measuring switching noise and hopping noise when a standard spindle motor is set vertically.

FIG. 3 and FIG. 4 illustrate the data of a thinner type spindle motor in which the number of stator coils 12 is set to 12. FIG. 5 and FIG. 6 illustrate the data of the standard spindle motor in which the number of stator coils 12 is set to 9.

Moreover, in the case of FIG. 3 and FIG. 5, data is obtained when the optical disk 20 is placed horizontally, while in the case of FIG. 4 and FIG. 6, data is obtained when the optical disk 20 is placed vertically.

In addition, total weight of rotating elements of the thinner spindle motor (FIG. 3 and FIG. 4) is 26.33 g, while that of the standard spindle motor (FIG. 5 and FIG. 6) is 40 g.

As will be obvious from data of FIG. 3 to FIG. 6, hopping noise is no longer generated when Mg attracting force becomes 0.8 or more and this hopping noise is rapidly reduced when the Mg attracting force exceeds 2.0.

Shape and structure of each element illustrated in the preferred embodiment explained above are only an example to embody the present invention and the technical scope of the present invention should never be appreciated within the limitation of such an example.

As will be obvious from above description, the iron core coil motor of the present invention is a coil motor in which the stator coil is formed as an iron core coil formed by winding a coil winding around the iron core. This iron core coil motor is characterized in that floating in the shaft direction of rotor is prevented with an attracting force which is generated by offsetting the centers of magnetism of the iron core of coil and rotor magnet and such an attracting force is set to 0.8 to 2.0 times the total weight of the rotating elements including the rotor.

Accordingly, in the iron core coil motor of the present invention, if the motor is used in the vertical attitude (the rotating shaft is set horizontally), hopping noise and switching noise are never generated.

Moreover, the disk drive of the present invention has a structure that a drive unit comprising a spindle motor for rotating the turn-table supporting a disk type storage medium to a mechanical chassis and a pickup for recording or reproducing signal to or from the disk type storage medium through movement in the radius direction of the disk type storage medium is supported by a base chassis via an elastic material. This disk drive is characterized in that the spindle motor is a iron core coil motor in which the stator coil is the iron core coil formed by winding a coil winding around the iron core, floating of rotor in the shaft direction is prevented with an attracting force generated by offsetting the centers of magnetism of the iron core of coil and rotor magnet and such an attracting force is set to 0.8 to 2.0 times the total weight of the rotating elements including the turn-table and disk type storage medium in addition to the rotor.

Therefore, in the disk drive of the present invention, hopping noise is never generated even when the motor is placed in the vertical attitude (rotating shaft is set horizontally) and signal read error is never generated easily. In addition, switching noise is never generated, assuring better operating conditions.

What is claimed is:

1. An iron core coil motor comprising:
   an electromagnet or a stator coil formed by winding a coil winding around an iron core, the electromagnet and the iron core, when energized, producing a magnetic field having a magnetic center;
   a stator substrate;
   a spindle shaft; and
   a rotor having a rotor magnet producing a magnetic field having a rotor magnetic center; whereby
   a first plane defined by the magnetic center of said iron core or said electromagnet is spaced apart from a second plane defined by the rotor magnetic center to generate an attracting force to prevent removal of said rotor in an axial direction, said attracting force being set from 0.8 to 2.0 times a total weight of rotating elements including said rotor.

2. A disk drive comprising:

a spindle motor for rotating a turn-table supporting a disk type storage medium;

a pickup for recording and/or reproducing signal to or from said storage medium through movement in the radius direction of said disk type storage medium; and a chassis for mounting said spindle motor, said pickup and the other devices;

said spindle motor including:

an electromagnet or a stator coil formed by winding a coil winding around an iron core, the electromagnet and the iron core, when energized, producing a magnetic field having a magnetic center;

a stator substrate;

a spindle shaft; and a rotor having a rotor magnet producing a magnetic field having a rotor magnetic center; whereby a first plane defined by the magnetic center of said iron core or said electromagnet is spaced apart from a second plane defined by the rotor magnetic center to generate an attracting force to prevent removal of said rotor in an axial direction, said attracting force being set from 0.8 to 2.0 times a total weight of rotating elements including said rotor.

* * * * *